OUTPUT CIRCUIT FOR PULSE CODE MODULATION TIME SHARING SYSTEM

Filed Nov. 21, 1966 3 Sheets-Sheet 1

INVENTOR.
FRANK S. BOXALL
BY Fleit, Hohbach, Test
Albritton & Herbert
ATTORNEYS

INVENTOR.
FRANK S. BOXALL
BY Fuller, Hohlbach, Test Albritton & Herbert
ATTORNEYS INVENTOR.
FRANK S. BOXALL
BY Fleher, Hohbach, Test Albritton & Herbert
ATTORNEYS United States Patent Office 3,524,938
Patented Aug. 18, 1970

3,524,938

OUTPUT CIRCUIT FOR PULSE CODE MODULATION TIME SHARING SYSTEM

Frank Stuart Boxall, Menlo Park, Calif., assignor to Vicom Corporation, Mountain View, Calif., a corporation of California Filed Nov. 21, 1966, Ser. No. 595,773
Int. Cl. H04j 3/14
U.S. Cl. 179—15 8 Claims

ABSTRACT OF THE DISCLOSURE

A PCM output circuit provides a test pattern which replaces the normal seven bit speech code by a code containing all 1's for two frames and all 0's for the next two frames. A blocking circuit removes the eighth bit of a word to provide a time slot for signalling. A zero code suppressor prevents the generation of a seven 0 code by placing a 1 in the seventh bit of a speech word. Zero code suppression is also used during terminal line up to set the coder reference voltage.

This invention relates generally to a pulse code modulation time sharing system for transmitting signals, messages and voice communication over repeated wire pairs, and more particularly to an output circuit for use therein.

One system of the above type is used for transmitting a plurality of channels of voice and signaling information over a single communication link. Each channel of information is in the form of eight-bit channel words. Seven consecutive bits represent a speech word and an eighth bit which carries signalling information. A framing bit is added every 24 channel words to form and define a frame. The channel information travelling along the communication link is received by repeaters disposed along the line and the channel information is regenerated and transmitted. The timing for the repeaters is obtained from the channel information received.

If there is an absence of channel information, the repeaters may lose their timing and introduce errors. Furthermore, when operating such a complex system, it is desirable to provide a line-up test pattern. Furthermore, there must be no interference with the signalling bits.

It is a general object of the present invention to provide an output circuit which meets the foregoing requirements.

It is another object of the present invention to provide an output circuit which can be conditioned to emit a test pattern for line-up.

It is a further object of the present invention to provide an output circuit which minimizes interference with signalling information.

It is still a further object of the present invention to provide a signalling system in which a conditional signal is introduced in the absence of actual signal to maintain the repeaters in synchronism.

It is still another object of the present invention to provide an output circuit which is capable of providing signals for setting reference levels in the system.

The foregoing and other objects of the invention will become more clearly apparent from the following description when taken in conjunction with the accompanying drawings.

The system of the present invention employs pulse code modulation time sharing. This involves sequential sampling, encoding and transmission of voice information and signalling information for 24 voice channels. This is followed by a decoding, distribution and filtering process at the receiving side of the system to reconstitute the voice information. This message processing scheme may be represented by the following formula:

$$\overbrace{VF \text{ to } PAM \text{ to } PCM}^{\text{transmitting}}\overbrace{\text{ to } PAM \text{ to } VF}^{\text{receiving}}\quad \underbrace{PCM}_{\text{line}}$$

where:

VF=voice frequency or signal
PAM=pulse amplitude modulated pulses
PCM=pulse code modulated word These symbols are quite useful and appear in the description which follows.

Figure 1:
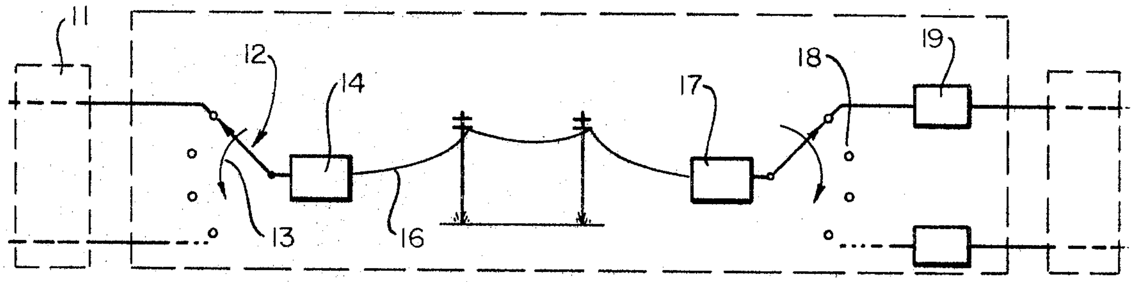
FIG. 1 is a simplified block diagram of a pulse code modulated time sharing system.

Referring particularly to FIG. 1, the above processes are schematically illustrated. Input voice messages from subscribers' telephones are routed through associated central office switching equipment 11 to the pulse code modulation system 12. The voice signals are first applied to periodic sampling gate 13. The output of these gates is a series of amplitude modulated pulses (PAM). It should be noted that these pulses carry an audio frequency component which forms a replica of the original voice message. Next, an encoder 14 measures each of these pulses and generates a corresponding seven-bit pulse code modulated word (PCM). The presence or absence of these code pulses is arranged to indicate the magnitude of the sampled portion of the voice message. The first bit has a relative value of 64 and each succeeding bit has a relative value which is one-half that of the preceding pulse, the seventh having a relative value of one.

These pulse coded words are then transmitted over appropriate wire pairs 16 provided with regenerative repeaters to the receiving end of the system. At the receiving end, a decoder 17 converts the pulse code (PCM) word back into a series of pulse amplitude modulated pulses (PAM). These pulses then pass through an approprite distribution gate 18 to a voice frequency filter 19. The filter removes the pulses and passes only the audio component which is a replica of the original voice message (VF). This message is routed out of the system through associated central office switching equipment to the telephones of receiver subscribers.

Figure 2:
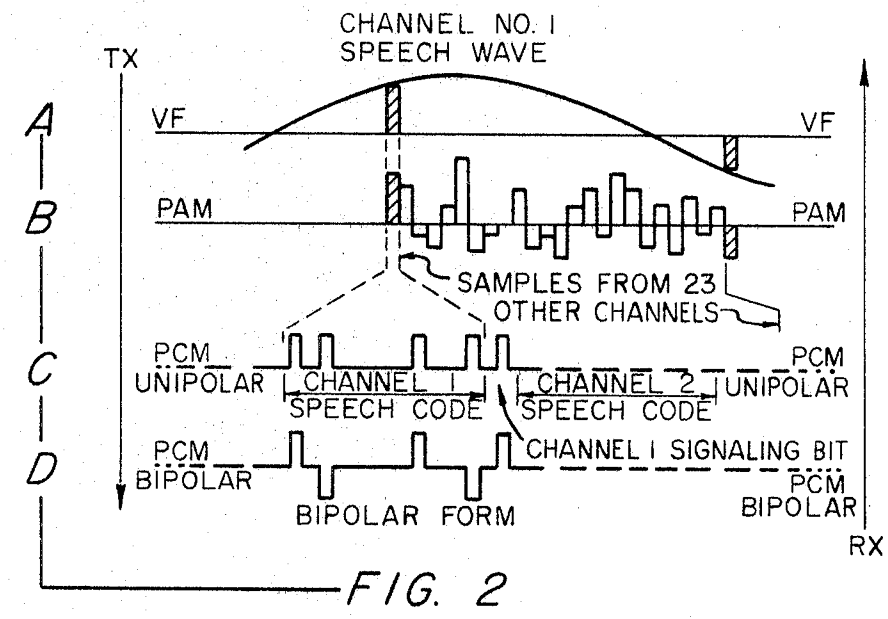
FIG. 2 shows typical waveforms at various points in a system of the above type.

Referring particularly to FIG. 2, there is shown a typical voice waveform and the various pulses appearing in the system. In FIG. 2A, there is illustrated the voice frequency or speech wave. In FIG. 2B, there is shown the sampling of this speech wave to form a pulse amplitude modulated pulse. In FIG. 2C, there is illustrated the pulse code modulated signal containing the seven bits of information. There is also illustrated in this figure the position for the signalling bit, which makes up the eighth bit of a channel word. Finally, the signal is transformed into bipolar form, FIG. 2D, for transmission along the repeated line.

The system must pass signalling and control information in addition to the message information (busy signals and dial pulses). This is accomplished by the use of the additional signalling bit in each PCM word associated with each channel.

Figure 3:
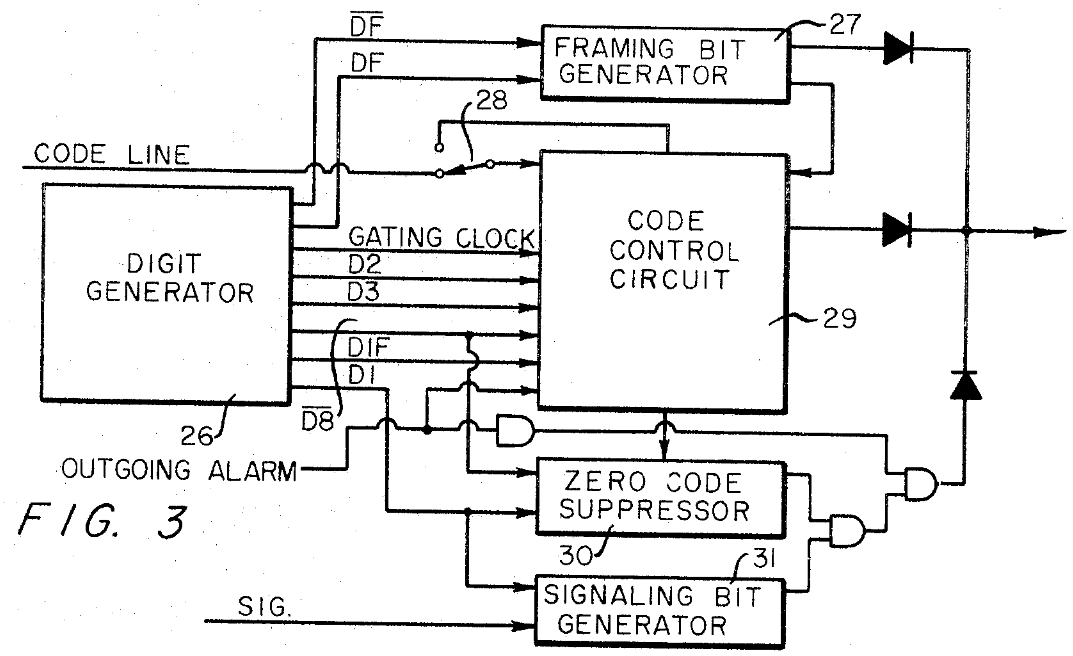
FIG. 3 is a schematic block diagram of an output circuit in accordance with the present invention.

An output circuit for receiving coded voice words from the encoder and signalling information and providing an output is shown in FIG. 3. Digit generator 26 generates the timing information for controlling, sampling, gating and processing of information. The digit generator employs conventional circuits dividing down from a crystal controlled oscillator. For example, in a communication system for which this system was particularly designed, the voice frequency is applied from 24 trunk lines. Each channel is adapted to pass a frequency from 250 to 3200 cycles per second. The voice frequency carried on each trunk line is sampled 8,000 times per second and the samplings are interleaved on a time division multiplex basis. Each sample is encoded in a seven-digit word in a scale of 127 quantized amplitude levels of 64 steps positive and 63 steps negative. The signalling information associated with each trunk line is transmitted between terminals in the form of an eighth digit in the corresponding channel word. The presence of the pulse in this eighth position indicates an on-hook signalling condition, while the absence of this pulse denotes an off-hook condition. Each time all of the 24 channels are sampled, a framing bit digit is provided in the pulse train. This framing bit digit is used to synchronize the receiving equipment in one terminal with the transmitting equipment in the opposite terminal. This combination of 24 eight-bit coded words plus a framing digit is called a frame. The illustration given above dictates a rate of $1.544\times10^6$ bits per second. Therefore, the digit generator in this particular instance divides down from a clock operating at 1.544 mc.

Figure 4:
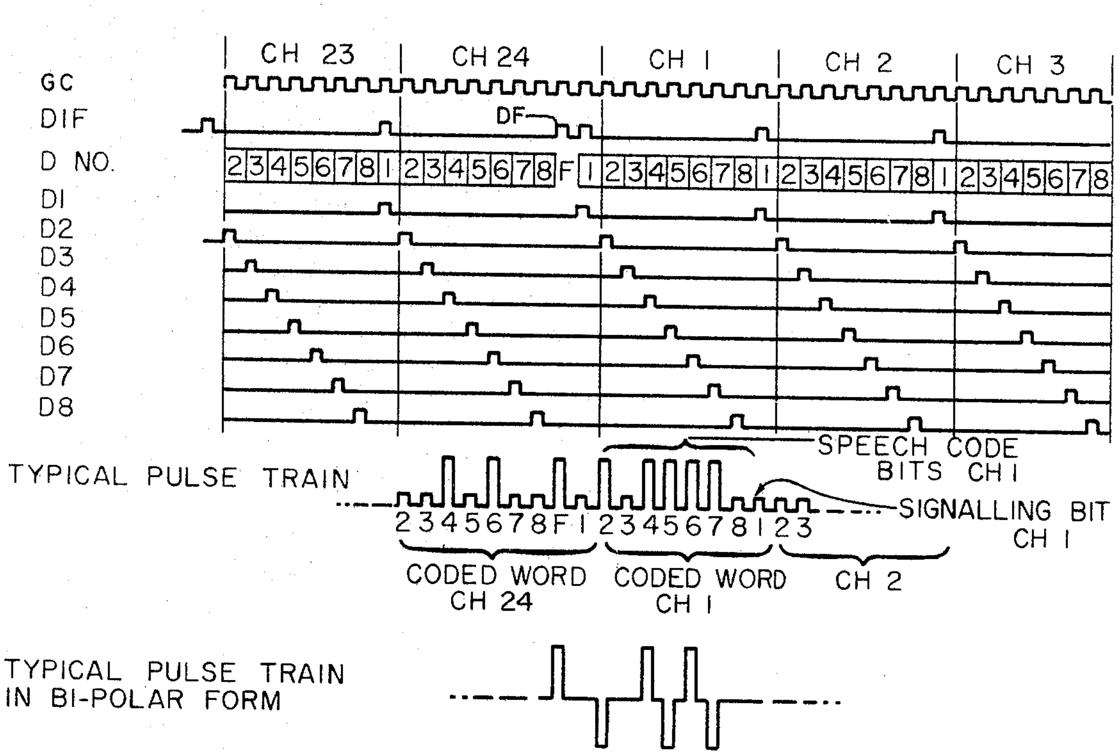
FIG. 4 is a system timing diagram showing the time relationship between the various signals.

One output from the digit generator is a gating clock. This is shown at the upper portion of FIG. 4, waveform GC. The digit generator also generates a framing digit designated DF which occurs once every 24 channels. The symbol $\overline{DF}$ represents a digit of opposite polarity. The digit generator also generates digits D1–D8 illustrated corresponding to the bits in each channel word. In a system which is in wide usage, the speech code is carried at digits D2–D8 and the signalling information at digit D1. The description in this application is in accordance with this convention.

A framing bit generator 27 receives the framing digits and generates a framing bit which is applied to the output. The framing bit generator also generates a so-called 2 kc. signal which is adapted to be switched by switch 28 into the code control circuit 29. The code control circuit is normally connected to the code line which provides the PCM signal from the encoder.

There is also provided a zero code suppressor 30 which assures that there is never transmitted a code consisting entirely of zeros but will include a one in the eighth digit position.

A signalling bit generator 31 provides signalling bits which are added to each PCM voice word.

Figure 5:
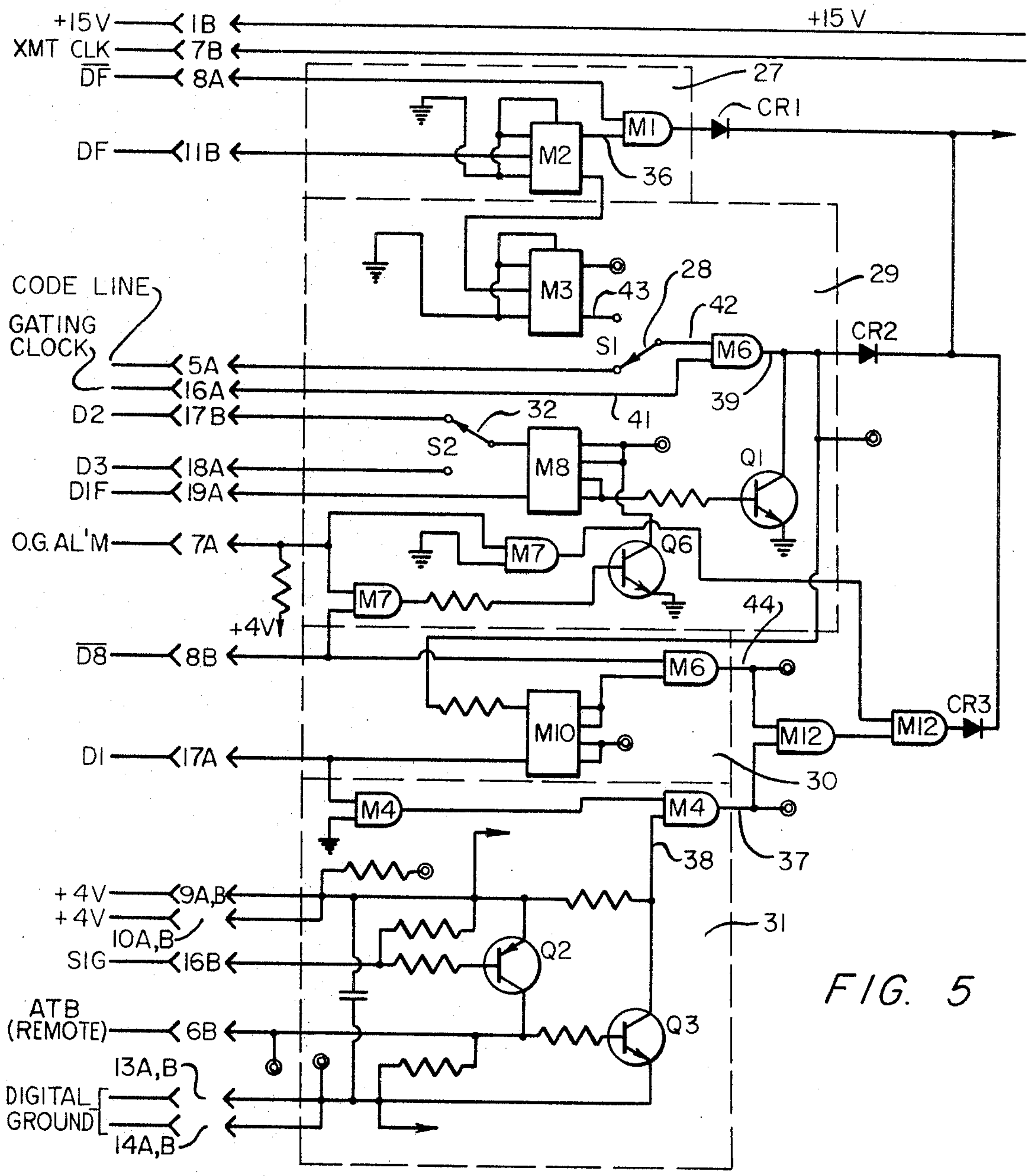
FIG. 5 is a schematic diagram of an output circuit in accordance with the present invention.

Referring now more specifically to FIG. 5, the dotted outline blocks show the logic circuits comprising the framing bit generator 27, code control circuits 29, zero code suppression circuit 30 and signalling bit generator 31.

These circuits may be classified functionally as follows:

| Function: | Active elements |
|---|---|
| Framing bit generator | ½M1, M2 |
| Signalling bit generator | Q2, Q3, M4 |
| Code control circuit | M2, ½M6, Q1, M8 |
| Zero code suppressor | M10, ½M6 |
| Outgoing alarm | M7, M12 |

FRAMING BIT GENERATOR

Each PCM frame contains a framing bit (BF), whose time of occurrence is controlled by framing digit pulse DF, generated by digit generator 26. If the receiving terminal is to be able to synchronize channel to channel, the framing bit must have a unique property which will enable the receiving terminal to distinguish it from the 192 other bits in the frame. The unique property associated with BF is that it alternates continuously (i.e., having value 1 in one frame, 0 in the next frame, 1 in the next, 0 in the next, etc.). Although other bits in the frame may change from one frame to the next, only BF can alternate continuously in this manner.

Figure 6:
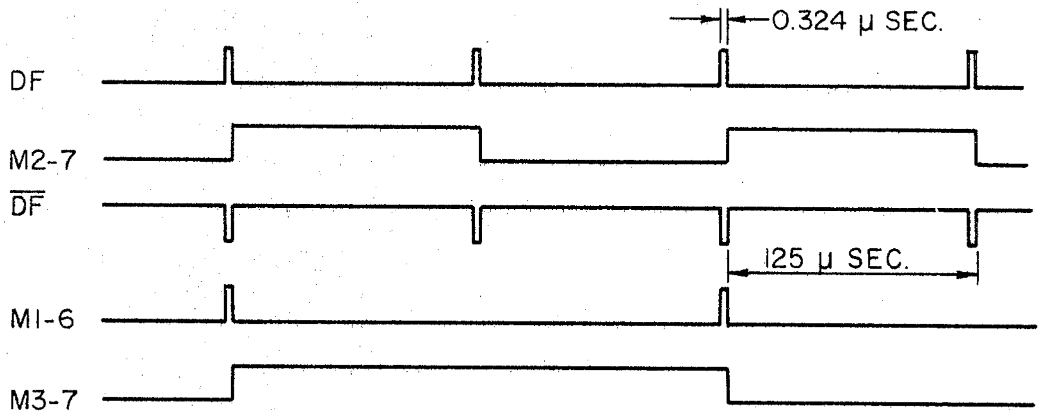
FIG. 6 is a timing diagram for the framing bit generator.

BF is generated by applying DF as the clock drive to flip-flop M2 (FIG. 5) connected in the divide-by-two mode. Consequently, the flip-flop output changes state at the end of very frame. This is illustrated in FIG. 6. The output 36 of M2 and $\overline{DF}$ are applied to gate M1 to produce an output which is 0 except at every other DF time. This output is the required BF and is applied through diode CR1 to a retiming circuit.

SIGNALLING BIT GENERATOR

Each PCM frame contains 24 signalling bits (one per channel) which carry dial-pulsing and supervisory information. These bits (B1) occur at D1 time and the information content is as follows:

When B1=1, Channel is on-hook
When B1=0, Channel is off-hook

Figure 7:
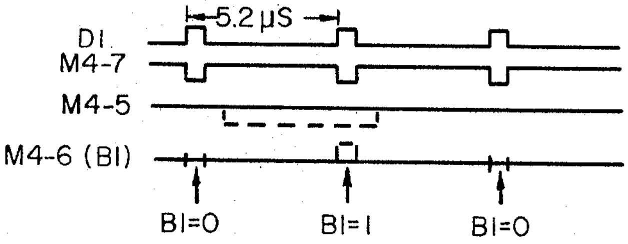
FIG. 7 is a timing diagram for the signalling bit generator.

The signalling bit is generated by D1 (from the digit pulse generator) applied through inverter M4 to gate M4. This is illustrated in FIG. 7. The output on line 37 of M4 is 0 except at D1 time when it may be either 0 or 1 depending on the input 38. The output is B1 and is applied to a retiming circuit through gates M12 and diode CR3.

The input 38 of M4 is controlled by the signal line via transistors Q2 and Q3. If the signal line draws current, Q2 and Q3 conduct and M4 emits B1=1. If the signal line does not draw current, Q2 and Q3 do not conduct and M4 emits B1=0. The signal line is connected in multiple to all 24 channel units, each of which contains a circuit (timed by the channel counter waveforms) that conducts if the channel is on-hook but does not conduct if the channel is off-hook. Thus in summary, the time-division multiplex of signalling information on the signal line is applied through Q2 and Q3 to M4 which gates $\overline{D1}$ to produce the B1 output.

FIG. 5 represents a common equipment board. The 24 channel units are constructed on 24 individual circuit boards each of which is operable when plugged into a wired shelf. All of these connect in parallel through shelf wiring to the signal line of FIG. 5 (Pin 16B).

If a channel unit is withdrawn from the shelf, the channel signalling circuit cannot draw current from the signal line at the appropriate channel time. Consequently, M4 produces B1=0 and the far-end terminal receives an off-hook indication for that channel. Thus, pulling a channel unit automatically busies the far-end.

If the collector of Q2 is grounded, then Q3 is non-conducting and M4 emits B1=0 for all channels and the far-end terminal receives an off-hook indication for all channels. This condition can be forced by means of a switch.

CODE CONTROL CIRCUIT

The speech information in the PCM frame is carried by the seven-bit sequence of B2 through B8, with 24 sequences (one for each channel) per frame. The speech code bits appear at the output 39 of gate M6 and are applied to a retiming circuit through diode CR2. Gate M6 has the gating clock GC on its input 41 and will produce a 0 output if input 41 is 1. If input 42 is 0, it will produce pulses (in accordance with the gating clock). Thus, the code word emitted by M6 is controlled by the input 42.

Note, however, that M6 has been expanded by Q1 to form a gate with a third input. This third input is normally 0 but is 1 at D1 and DF and DF times (DIF). Thus, the M6 output is normally controlled by input 42 but is forced to zero when necessary to avoid interference with signalling or framing information. This blocking action of Q1 is controlled by M8 as described below.

In normal operation M6 input 42 is connected through S1 to the encoder whereby input 42 is in accordance with the speech code in such a way that the M6 output is the code word representing the speech sample. Alternatively, input 42 can be connected through S1 to output 43 of M3, which is a flip-flop clocked by the M2 output. Consequently, the M3 output changes state every other frame.

The M3 output simply a 2 kc. squarewave which causes the code bit output of M6 to be all 0's for two frames, all 1's for the next two frame (except Q1 blocks as necessary) etc. This particular sequence of code bits is called 2 kc. operation and is very useful as a test pattern and a line-up tool. It is obtained simply by throwing toggle switch S1.

As noted above, M8 applies a blocking signal to Q1 so that the M6 output is bero at D1 and DF times. Otherwise, an output from M6 would interfere with framing or signalling information. M8 is a flip-flop which is set by DIF and cleared by D2 to produce the normal blocking interval at the base of Q1. However, under local alarm conditions the outgoing alarm lead is grounded and $\overline{D8}$ sets M8 via M7 and Q6. This causes the M6 output to be 0 at D8, D1, and DF times.

Switch S2 selects either D2 or D3 as the clear pulse for M8. Normally D2 is used for this purpose. If D3 is used, then the blocking interval is longer and M6 emits B2=0. This option is used during line-up to set the coder reference, and is explained below under Zero Code Suppression.

ZERO CODE SUPPRESSION

This circuit is necessary to ensure that the PCM frame never contains a speech code word consisting of seven consecutive zeros. If the all-zero code word were permitted, it is conceivable that the PCM frame could contain long runs of consecutive zeros. Consequently, the line repeaters (which derive their local clock from the pulse train) might lose timing synchronism and produce errors. This possibility is removed by the use of zero code suppression.

Flip-flop M10 is set by D1 and its clear output controls gate M6, whose other input is $\overline{D8}$. Therefore, if M10 remains set at D8 time, then M6 will emit a pulse on line 44. This output is called "conditional B8," and is applied to the retiming circuit through gates M12 and CR3. It is produced only on the condition that M10 has not been cleared before D8 time. The clear input to M10 is the speech code output from M6. Thus, if the speech code is all zeros, then M10 does not clear but produces B8=1. Otherwise, M10 clears before D8 time and the conditional B8 pulse does not occur. When S1 is in the 2 kc. code position, the speech code output is zero through two frames. During this time the zero code suppressor inserts B8 pulses into every code word.

The zero code suppression is used during terminal line-up to set the coder reference voltage. With a zero signal into the coder, the coder reference should be adjusted to produce code 64 which is the sequence 1000000 at output 44 of M6. Now throwing S2 so that M8 clears on D3 (instead of D2) causes Q1 to block B2 (the first bit). The M10 is not cleared and causes a conditional B8 pulse. No other setting of the coder reference can cause this to happen. The presence of conditional B8 pulses can be read on a DC meter. This leads to a very simple procedure for setting the coder reference.

OUTGOING ALARM

In normal operation, the O.G. (outgoing) alarm lead is at logical 1. This holds the output of M7 at 0 so that $\overline{D8}$ cannot set M8 and so that M12 passes B1 and conditional B8 through diode CR3 to the retiming circuit. When the near-end terminal is in a local alarm condition, it must inform the far terminal by sending a unique code. This unique code is simply that every B1 and B8 is zero. A local alarm grounds the outgoing alarm lead so that the output of M7 goes to 1 and the output of M12 goes to 0. This forces B1 and conditional B8 to be zero as required. In addition, M7 now passes $\overline{D8}$ to set M8 via Q6. This is necessary to force the B8 output of M6 to be zero.

Thus, there has been provided an output circuit for receiving signalling, voice code information and framing information and forming an output PCM signal for transmission. The circuit is also settable to produce testing signals for lining up and adjusting the system.

I claim:

1. In a pulse code modulated time sharing system for transmitting a plurality of channels of voice signals and signalling information, each channel including an eight bit word formed by digit clocking pulses with seven bits representing a speech word and an eighth bit signalling information with a framing bit added every twenty-four words to form a frame, means for generating digit clocking pulses and framing digit pulses, means connected to receive said framing digit pulses and change state upon the reception of two successive pulses, and gate means connected and responsive to said change of state of said last named means to open for two frames and close for two frames, said gate means also being connected to receive digit clocking pulses whereby said gate means serves to transmit the digit clocking pulses for two frames the word information of such frames representing a maximum quantized information level and block the digit clocking pulses for the next two frames the word information of such frames representing a minimum level.

2. A pulse code modulated time sharing system as in claim 1 in which said means connected to receive said framing digit pulses and change state includes first bistable means adapted to receive said framing digit pulses and change state in response thereto, and second bistable means connected to receive an output from said first bistable means and serving to change state every other frame.

3. In a pulse code modulated time sharing system for transmitting a plurality of channels of voice signals and signalling information, each channel including an eight bit word formed by digit clocking pulses with seven bits representing a speech word and an eighth bit signalling information with a framing bit added every twenty-four words to form a frame, means for generating digit clocking pulses, means for generating a seven-digit coded speech word, gate means connected to receive said digit clocking pulses and said speech code pulses and serving to pass a clocking pulse each time a speech pulse occurs, and means connected to the output of said gate means serving to block the output from said gate means in response to the clock pulses corresponding to the signalling bits of the channel word and to the framing bits.

4. In a pulse code modulated time sharing system for transmitting a plurality of channels of voice signals and signalling information, each channel including an eight bit word formed by digit clocking pulses with seven bits representing a speech word and an eighth bit signalling information with a framing bit added every twenty-four words to form a frame, means for generating digit clocking pulses, means for generating coded digit speech pulses, first gate means adapted to receive said digit clocking pulses and said coded speech pulses and serving to pass said clocking pulses each time a speech code pulse occurs to provide an output pulse, bistable means connected to be set by the clocking pulse corresponding to the signalling bit of a word and to be reset by any output pulse from said first gating means subsequent to said signalling bit, and second gate means coupled to said bistable means and connected to receive a digit clocking pulse corresponding to the last bit of said speech word and pass the same if said bistable means is in a set condition when such digit pulse occurs.

5. A pulse code modulated time sharing system as in claim 4 together with means for generating framing digit pulses, means connected to receive said framing digit pulses and change state upon the reception of two successive pulses, said first gate means being connected and responsive to said change of state of said last named means to open for two frames and close for two frames, whereby said first gate means serves to transmit the digit clocking pulses for two frames the word information of such frames representing a maximum quantized information level and block the digit clocking pulses for the next two frames the word information of such frames representing a minimum level.

6. A pulse code modulated time sharing system as in claim 5 together with means connected to the output of said first gate means serving to block the output from said gate means in response to the clock pulses corresponding to the signalling bits of the channel word and to the framing bits.

7. In a pulse code modulated time sharing system for transmitting a plurality of channels of voice signals and signalling information, each channel including an eight bit word formed by digit clocking pulses with seven bits representing a speech word and an eighth bit signalling information with a framing bit added every twenty-four words to form a frame, means for generating digit clocking pulses, means for generating a seven-digit coded speech word, gate means connected to receive said digit clocking pulses and said speech code pulses and serving to pass a clocking pulse each time a speech pulse occurs, means connected to the output of said gate serving to block the output from said gate means in response to the clock pulses corresponding to the signalling bits of the channel word and to the framing bits and to the first bit of said speech word.

8. A pulse code modulated time sharing system as in claim 7 together with means for encoding speech samples into a pulse code by comparison with an encoder reference voltage and where a zero level speech sample signal produces a pulse coded speech word of 1000000 said reference voltage being adjustable, said first bit of said speech word being blocked by said blocking means, together with means for suppressing the last "0" bit of said speech word and to insert a "1" bit in response to the presence of all "0's" in the remainder of said speech word, and together with means for sensing said "1" bit whereby said reference voltage may be adjusted to produce said coded speech word of 1000000 in response to a zero level speech sample.

References Cited

UNITED STATES PATENTS

| | | | |
|---|---|---|---|
| 2,527,638 | 10/1950 | Kreer et al. | 179—15 |
| 2,949,503 | 8/1960 | Andrews et al. | 179—15 |
| 2,953,694 | 9/1960 | Wilson | 179—15 |
| 2,984,706 | 5/1961 | Jamison et al. | 179—15 |
| 3,030,448 | 4/1962 | Leonard et al. | 179—15 |
| 3,112,370 | 11/1963 | Longton | 179—15 |
| 3,359,373 | 12/1967 | Anderson et al. | 179—15 |

KATHLEEN H. CLAFFY, Primary Examiner

A. B. KIMBALL, JR., Assistant Examiner